(12) United States Patent
Seki

(10) Patent No.: US 12,466,671 B2
(45) Date of Patent: Nov. 11, 2025

(54) POWDER SUPPLY DEVICE

(71) Applicant: TSUKASA CO., LTD., Aichi (JP)

(72) Inventor: Tomonori Seki, Aichi (JP)

(73) Assignee: TSUKASA CO., LTD., Aichi (JP)

( * ) Notice: Subject to any disclaimer, the term of this patent is extended or adjusted under 35 U.S.C. 154(b) by 287 days.

(21) Appl. No.: 18/192,209

(22) Filed: Mar. 29, 2023

(65) Prior Publication Data

US 2023/0234794 A1 Jul. 27, 2023

Related U.S. Application Data

(63) Continuation of application No. PCT/JP2021/040286, filed on Nov. 1, 2021.

(30) Foreign Application Priority Data

Nov. 3, 2020 (JP) .................................. 2020-184018

(51) Int. Cl.
*B65G 65/32* (2006.01)
*B65G 65/00* (2006.01)

(52) U.S. Cl.
CPC .......... *B65G 65/32* (2013.01); *B65G 65/005* (2013.01); *B65G 2201/042* (2013.01)

(58) Field of Classification Search
CPC ............. B65G 65/32; B65G 65/005; B65G 2201/042; B65G 2201/04; B65G 65/40; B65G 2201/0235; G01G 19/306; G01G 19/346

See application file for complete search history.

(56) References Cited

U.S. PATENT DOCUMENTS

2021/0309450 A1\* 10/2021 Sleeman ................ B65G 47/19

FOREIGN PATENT DOCUMENTS

| JP | 06-174537 A | 6/1994 |
|---|---|---|
| JP | 2000-136025 A | 5/2000 |
| JP | 2001-130748 A | 5/2001 |
| JP | 2001-201393 A | 7/2001 |
| JP | 2005-007387 A | 1/2005 |
| JP | 2005-280817 A | 10/2005 |
| JP | 2014-55775 A | 3/2014 |
| JP | 2014-232006 A | 12/2014 |
| WO | 2013038394 A2 | 3/2013 |

OTHER PUBLICATIONS

International Search Report from International Application No. PCT/JP2021/040286 mailed Jan. 25, 2022, 4 pages.

\* cited by examiner

*Primary Examiner* — Donnell A Long
(74) *Attorney, Agent, or Firm* — Shih IP Law Group, PLLC

(57) ABSTRACT

An object of the invention is to provide a space-saving powder supply device capable of supplying a plurality of kinds of powder at one place. A powder supply device according to the present invention is provided with: a main body; a container for storing powder therein; a conveyance unit; and a plurality of stockers. The conveyance unit has a supply region which is a region for supplying the powder from the stocker to the container mounted on the upper side of the conveyance unit. The stocker has: a charge port through which the powder can be charged into the stocker; a supplier for supplying the powder stored in the stocker from the supply port. The stocker is connected to the main body, with the plurality of stockers being arranged radially around the supply region, and a center axis of the supplier being directed to a center of the supply region.

4 Claims, 3 Drawing Sheets

POWDER SUPPLY DEVICE

TECHNICAL FIELD

The present invention relates to a powder supply device, and more particularly, to a powder supply device for supplying powder to a container conveyed by a conveyance unit.

BACKGROUND ART

For a process of supplying multiple kinds of powder to one container and storing the powder in the container, much time and labor are required if the process is performed manually, since the amount of work is large, and human errors are easily generated. When repeating the above process, the probability of the occurrence of human error is further increased. Patent Literature 1 discloses a powder automatic measuring and filling device for measuring the weight of a predetermined amount of powder and filling it in a container conveyed by a conveyor. The powder automatic measuring and filling device is provided with a detaching means for detaching the container from the conveyor, a cutting out machine for cutting out the powder into the detached container, a measuring instrument for measuring the self-weight of the powder cut out into the container, and a controller for controlling the cutting out amount of the powder on the basis of the measured value measured by the measuring instrument.

CITATION LIST

Patent Literature

Patent Literature 1: JP2001-201393A

SUMMARY OF INVENTION

Technical Problem

A place for cutting out a powder is required for each powder in the invention of Patent Literature 1. Accordingly, places for cutting out powder are increased as the kinds of the powder to be cut out are increased, and thus a space required for installation of the device becomes large.

Therefore, an object of the invention is to provide a space-saving powder supply device capable of supplying multiple kinds of powder at one place.

Solution to Problem

A powder supply device according to the present invention comprises: a main body; a container for storing powder therein with an opened upper side; a conveyance unit having a drive state in which the container placed on an upper side thereof is conveyed and a stop state in which the container placed on the upper side thereof is stopped; and a plurality of stockers to be connected to the main body, to store the powder therein and to supply the powder to an outside thereof. The conveyance unit has a supply region which is a region for supplying the powder from the stocker to the container placed on the upper side of the conveyance unit. The stocker comprises: a charge port through which the powder can be charged into the stocker; and a supplier that includes a supply port and supplies the powder stored inside the stocker from the supply port to the container. The stocker is connected to the main body, with the plurality of stockers being arranged radially around the supply region, and a center axis of the supplier being directed to a center of the supply region. The powder is supplied to the container from the supply port when the container placed on the upper side of the conveyance unit is positioned in the supply region and the conveyance unit is in the stop state According to this configuration, the powder can be supplied from the stockers radially arranged around the supply region to the container conveyed to the supply region by the conveyance unit, and the powder can be stored inside the container. Therefore, supply of the powder from the plurality of stockers can be performed at one place, and a supply place is not required for each supplied powder, thus a space required for installing the powder supply device can be reduced.

Preferably, the stocker has a structure to be detachably connected to the main body. According to this configuration, it is possible to replace the stocker connected to the powder supply device with another stocker, and work for switching the powder supplied from the powder supply device to another powder is simplified. Further, maintainability of the powder supply device is also improved.

Preferably, the main body has a controller, and the controller controls conveyance of the container by the conveyance unit and supply of the powder by the supplier. According to this configuration, the efficiency of the conveyance of the container and the supply of the powder is improved.

Preferably, the conveyance unit has a measurement unit in the supply region, and the measurement unit measures the weight of the powder stored in the container when the container placed on the upper side of the conveyance unit is positioned on the upper side of the measurement unit, and the conveyance unit is in the stop state. According to this configuration, the plurality of stockers supply the powder in order one by one, whereby a plurality of kinds of powders stored in the container can be measured by one measurement unit.

The lexical interpretation is as follows. The "powder" includes either a granule or a mixture of a powder and a granule in addition to a powder. The use of the powder may be for food, medicine, building, civil engineering, semiconductors or the like, and is not limited.

The "powder is supplied from the supply port" means that the powder is discharged from the supply port to the outside of the stocker. For example, powder is supplied for the purpose that the discharged powder is dropped and stored in the container and the weight of the powder in the container is measured by the measurement unit.

Although the "supplier" is exemplified by a screw conveyor and a screw feeder, another powder supplier, for example, a vibration feeder, a belt conveyor, etc., can be also adopted if it has a powder transfer function.

The "conveyance unit" is not particularly limited, and an existing one, for example, a roller conveyor, a belt conveyor, or the like, can be adopted.

The "measurement unit" is not particularly limited, and an existing one, for example, an electronic balance or the like can be adopted.

The "connection" means connecting two things, and includes both fixing connection, and detachable connection.

Advantageous Effects of Invention

According to the present invention, it is possible to supply a plurality of types of powder at one location, and thus to reduce the space required for installation of the powder supply device.

DESCRIPTION OF EMBODIMENTS

Figure 1:
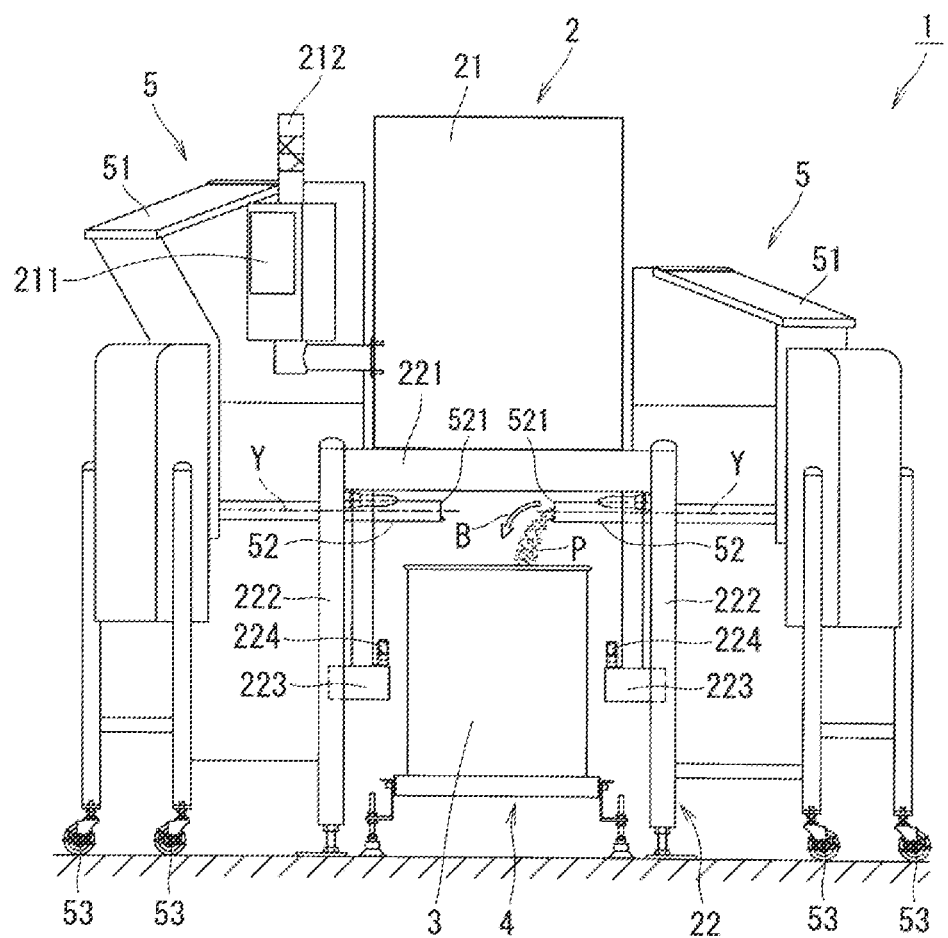
FIG. 1 is a front view of a powder supply device according to the present embodiment.
Figure 2:
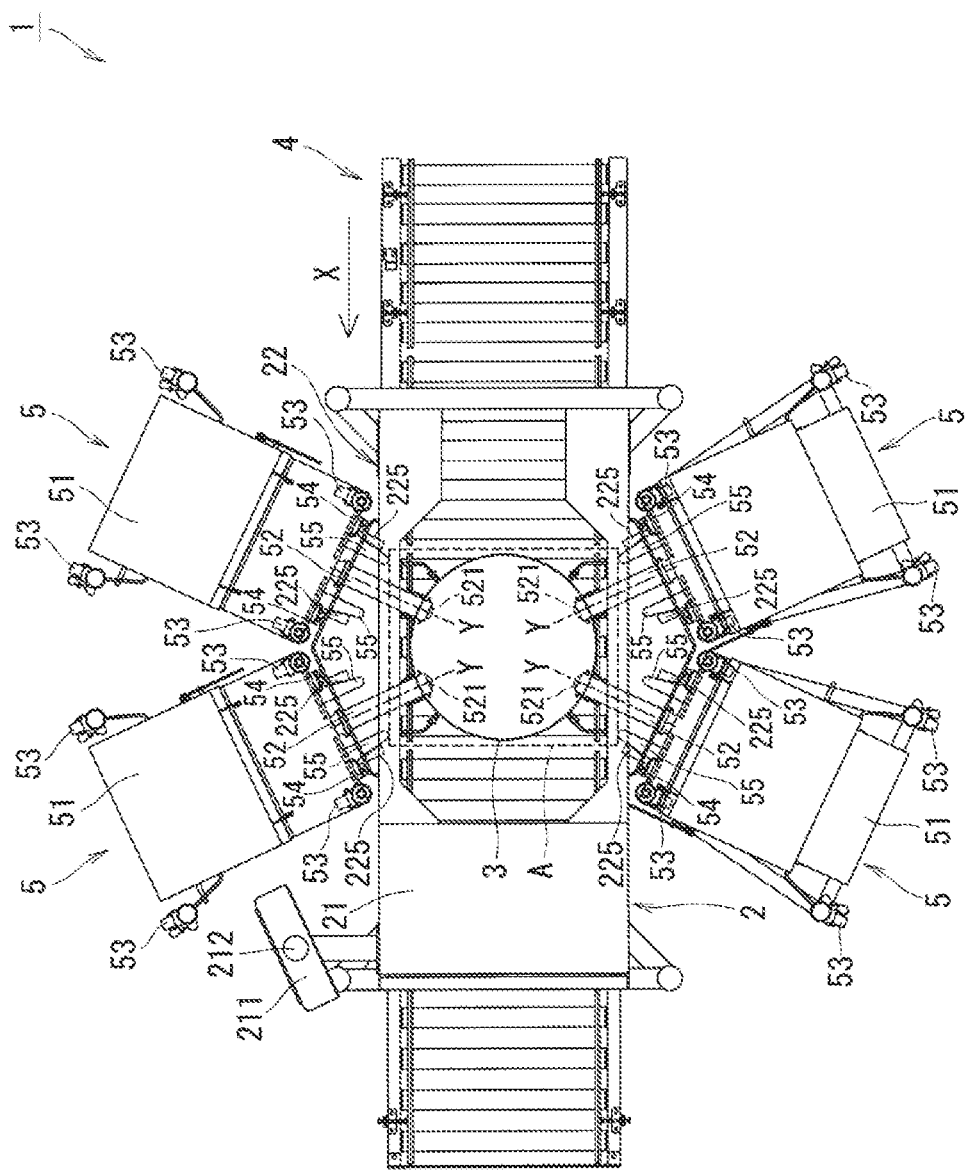
FIG. 2 is a plan view according to the present embodiment.
Figure 3:
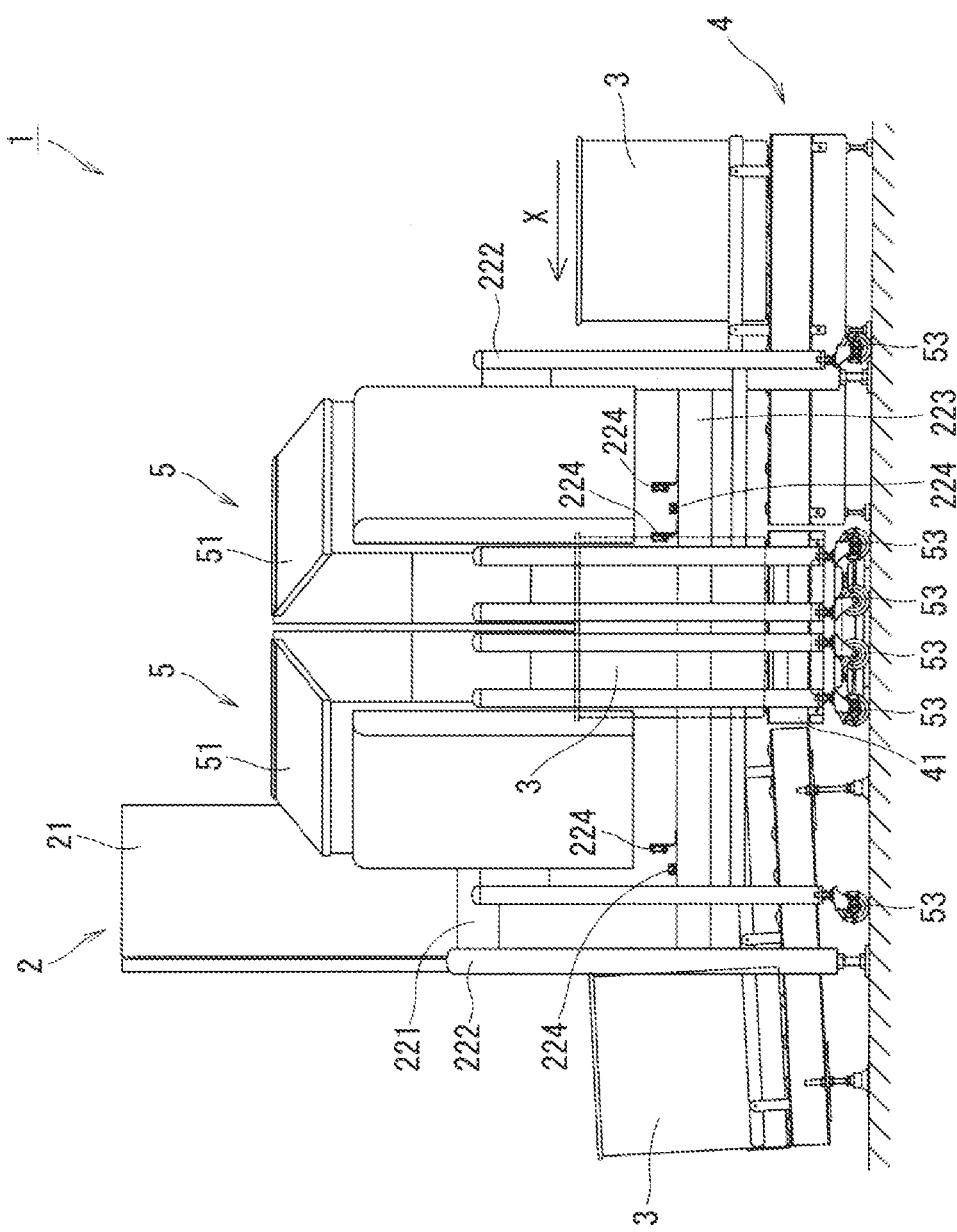
FIG. 3 is a right side view according to the present embodiment.

A powder supply device 1 (hereinafter referred to as a supply device 1) will be explained with reference to FIGS. 1-3. The supply device 1 includes: a main body 2; a container 3 with an opened upper side and for storing powder P therein; a conveyance unit 4 having a drive state for conveying the container 3 placed on the upper side and a stop state for stopping the container 3 placed on the upper side; and a plurality of stockers 5 connected to the main body 2, storing the powder P therein, and supplying the powder P to the outside.

The main body 2 is provided with a main body portion 21 and a stand frame 22 for supporting the main body portion 21, and the stocker 5 is detachably connected to the stand frame 22.

The main body portion 21 has a controller 211 and a notification unit 212. The controller 211 controls conveyance of the container 3 by the conveyance unit 4, with the conveyance unit 4 being connected to the main body 2, and controls supply of the powder P by the supplier 52 described later, with the stocker 5 being connected to the main body 2. These controls can be performed manually or automatically by setting.

The notification unit 212 notifies that the state of the conveyance unit 4 is switched by the control when the controller 211 controls the conveyance unit 4, and is useful for preventing inconvenience due to driving or stopping of the conveyance unit 4. The notification unit 212 notifies that the amount of the powder P stored in the container 3 is abnormal when the weight of the powder P stored in the container 3 measured by a measurement unit 41 described later is an abnormal amount exceeding a predetermined weight due to a trouble such as a malfunction or a failure of the machine. By this notification, the container 3 storing the powder P of the abnormal amount exceeding the predetermined weight can be prevented from being conveyed to the downstream side of the supply region A described later. The notification unit 212 of the present embodiment is a rotary lamp, and is lit when the controller 211 controls the conveyance unit 4 and the state of the conveyance unit 4 is switched, and stops after the elapse of a predetermined time. As the notification unit 212, other devices can be also adopted if they can notify that the state of the conveyance unit 4 is switched. For example, a speaker or the like audibly notifying by sound, and an electric lamp or the like visually notifying by light can be adopted.

The stand frame 22 has a hollow inside, includes: a pedestal portion 221 for placing the main body portion 21; leg portions 222; reinforcement members 223 for connecting the leg portions 222 to each other; a position detection units 224; and guide receiving members 225 into which guides 55 described later are to be fit when the stockers 5 are inserted into the main body 2. The stand frame 22 is arranged across the conveyance unit 4, and the container 3 placed on the upper side of the conveyance unit 4 can pass through the inside of the stand frame 22 (see FIGS. 1, 2). Therefore, the main body 2 is arranged so that the container 3 conveyed by the conveyance unit 4 passes under the pedestal portion 221 and between the leg portions 222.

The position detection unit 224 is installed on the reinforcement members 223, and can detect whether the position of the container 3 placed on the conveyance unit 4 is in the supply region A described later. The position detection unit 224 of the present embodiment is, for example, a photoelectric sensor having a light-emitting diode, a light-receiving diode, etc., but is not particularly limited, and can adopt an existing position detection device.

The conveyance unit 4 has a supply region A which is an region for supplying the powder P from the stocker 5 to the container 3 placed on the upper side of the conveyance unit 4. The conveyance unit 4 further includes a measurement unit 41 which is arranged in the supply region A and measures the weight of the powder P in the container 3.

The conveyance unit 4 has a drive state and a stop state. In the drive state, the container 3 placed on the upper side of the conveyance unit 4 is conveyed in the conveyance direction X shown in FIGS. 2 and 3, respectively. In the stop state, the container 3 placed on the upper side of the conveyance unit 4 can be stopped. By controlling the state of the conveyance unit 4, the container 3 placed on the upper side of the conveyance unit 4 can be conveyed to the supply region A and can be stopped in the supply region A. The container 3 stopped in the supply region A can be conveyed from the supply region A. The conveyance unit 4 of the present embodiment is a roller conveyor, but is not particularly limited, and can adopt an existing conveyance device, for example, a belt conveyor.

The measurement unit 41 measures the weight of the powder P stored in the container 3 when the container 3 placed on the upper side of the conveyance unit 4 is positioned on the upper side of the measurement unit 41 and the conveyance unit 4 is in the stop state. In the measurement unit 41 of the present embodiment, a roller conveyor is fixed to the upper side of a dust-proof load cell type electronic balance. The roller conveyor of the measurement unit 41 is arranged independently of the roller conveyor on the upstream side and the downstream side with the conveyance direction X as a reference, and the weight of a container 3 placed on the roller conveyor on the upstream side and downstream side is not included in the measurement by the dust-proof load cell type electronic balance. The dust-proof load cell type electronic balance can accurately measure the weight of the powder P stored in the container 3 placed on the upper side of the measurement unit 41. The height of the roller conveyor of the measurement unit 41 is aligned with the height of the roller conveyor on the upstream side and the downstream side of the measurement unit 41, and the container 3 placed on the upper side of the conveyance unit 4 can smoothly pass the upper side of the measurement unit 41 without being held. The supply device 1 can control the supply flow rate of the powder P supplied from the stocker 5 by the main body 2 according to the weight of the powder P stored in the container 3 and measured by the measurement unit 41, and thus can accurately supply the powder P of a predetermined weight to the container 3 from the stocker 5. The measurement unit 41 is not particularly limited, can adopt an existing measuring instrument, and is preferably dust-proof considering that it is used for measuring the powder P.

The stocker 5 has a charge port 51 through which the powder P can be charged therein, and a supplier 52 including a supply port 521 and supplying the powder P stored inside from the supply port 521 to the container 3. The powder P stored in the stocker 5 is supplied from the supplier 52 through the supply port 521. For example, when the powder P is supplied from the stocker 5 on the right side in FIG. 1 to the container 3, the powder P is discharged from the supply port 521 in the direction shown by an arrow B. The supplier 52 according to the present embodiment is a cylindrical screw feeder. The stocker 5 further includes: a plurality of casters 53 at the bottom, one or more of the casters 55 having a rotation stopper; elastic members 54; and guides 55 to be inserted into the main body 2. The stocker 5 is movable in an arbitrary direction by the casters 53.

The stocker 5 according to the present embodiment is structured to be detachably connected to the main body 2 so that the plurality (four in this embodiment) of stockers 5 is arranged radially around the supply region A which is set to enable the container 3 to be supplied with the powder P, and that the center axis Y of the supplier 52 is directed to the center of the supply region A. For example, a mechanical insertion and extraction structure is applicable. The stocker 5 is pushed into the main body 2, and the guide 55 is inserted into the main body 2, to mount the stocker 5 to the main body 2. The stocker 5 is pulled out from the main body 2, and the guide 55 is separated from the main body 2, to separate the stocker 5 from the main body 2. At this time, in a state where the stocker 5 is mounted to the main body 2, the guide 55 is inserted into the main body 2 and fitted to the guide receiving member 225. Thus, the stocker 5 and the main body 2 are fixed, and the deviation of the direction of the center axis Y of the supplier 52 can be prevented. The elastic member 54 has elasticity, is a member for buffering an impact by elastic deformation, is positioned outside the guide 55, and is in contact with the main body 2 in a state where the stocker 5 is mounted to the main body 2. When the stocker 5 receives an unexpected impact from the outside, the impact is absorbed by the elastic member 54 to prevent the stocker 5 itself from coming into contact with the main body 2 and being damaged.

The stocker 5 is mounted to the main body 2 in a state where the vicinity of the tip of the supplier 52 including the supply port 521 is inserted into the stand frame 22, and the supply port 521 is located above the supply region A and above the container 3 placed in the supply region A. When the conveyance unit 4 is in the stop state, the powder P can be supplied from the supply port 521 to the container 3 positioned in the supply region A. The other part of the supplier 52 is positioned in the internal space of the stocker 5, and the powder P stored in the stocker 5 is supplied to the inside of the supplier 52 from an opening of the supplier 52.

Mounting of the stocker 5 to the main body 2 is completed by moving the stocker 5 to a position for supplying the powder P, pushing the guide 55 and the vicinity of the tip of the supplier 52 including the supply port 521 of the stocker 5 into the stand frame 22 of the main body 2, fitting the guide 55 and the guide receiving member 225, fixing the position of the stocker 5 by operating the rotation stopper of the caster 53, and connecting the main body 2 and the stocker 5 by a cable (not shown). Separation of the stocker 5 from the main body 2 is completed by removing a cable connecting the main body 2 and the stocker 5, releasing the rotation stopper of the caster 53, pulling the stocker 5 out from the main body 2, and moving the stocker 5 from a position for supplying the powder P. The main body 2 and the stocker 5 can be easily attached and detached, and the mounted stocker 5 and the other stocker 5 can be easily replaced. That is, the individual stockers 5 are mounted to the main body 2 to be mutually exchangeable.

Since the stocker 5 and the other stocker 5 can be exchanged, the kind of the powder P to be supplied to the container 3 can be easily switched. Since the stocker 5 can be detached from the main body 2, maintenance can be performed in a state where the stocker 5 is separated from the main body 2, and maintainability of the powder supply device 1 is improved. For example, when the supplier 52 fails, repair and replacement are easy.

The operation procedure of the supply device 1 is explained. The stocker 5 is mounted to the main body 2. The number of the stocker 5 mounted to the main body 2 is arbitrary, and the number of the stocker 5 to be mounted can be determined in consideration of the kind, amount, etc. of the supplied powder P. The timing of charging the powder P to be stored in the stocker 5 into the stocker 5 may be any time before the powder P is supplied to the container 3, but it is preferable that the stocker 5 is mounted to the main body 2 after the powder P is charged into the stocker 5 from the viewpoint of operability.

The container 3 is placed on the upper side of the conveyance unit 4. At this time, the conveyance unit 4 is in a stop state. The controller 211 of the main body 2 drives the conveyance unit 4 to convey the container 3 toward the measurement unit 41. At this time, the notification unit 212 notifies that the state of the conveyance unit 4 is switched. The notification by the notification unit 212 is stopped after the elapse of a predetermined time.

When the position of the container 3 is detected to be the upper side of the measurement unit 41 by the position detecting unit 224, the controller 211 controls the conveyance of the container 3 by the conveyance unit 4, and the conveyance unit 4 is brought into a stop state. At this time, as in the case described above, the notification unit 212 notifies that the state of the conveyance unit 4 is switched. The notification by the notification unit 212 is stopped after the elapse of a predetermined time.

The controller 211 controls the supply of the powder P by the supplier 52, and the supply of the powder P is started from the stocker 5 to the container 3. The container 3 is positioned on the upper side of the measurement unit 41, and the measurement unit 41 measures the weight of the powder P stored in the container 3. When the weight of the powder P stored in the container 3 reaches a predetermined weight, for example, a weight sensor (not shown) of the controller 211 is started to control the supply of the powder P by the supplier 52, and the supply of the powder P is stopped.

When the weight of the powder P stored in the container 3 and measured by the measurement unit 41 is an abnormal amount exceeding a predetermined weight in the supply of the powder P from the stocker 5 to the container 3 due to trouble such as malfunction or failure of the machine, the notification unit 212 notifies that the amount of the powder P stored in the container 3 is abnormal, and the conveyance of the container 3 from the measurement unit 41, which is a subsequent process described later, is prevented, so that the conveyance is not performed. The container 3 storing the powder P of the abnormal amount exceeding the predetermined weight can be prevented from being conveyed to the downstream side of the supply region A.

The start and stop of the supply of the powder P from the stocker 5 may be repeated any number of times according to the situation of the supply work. When the powder P is supplied from the plurality of stockers 5, each stocker 5 supplies the powder P one by one in order. Thus, since the weight of the powder P supplied by each stocker 5 can be measured by the measurement unit 41, multiple kinds of powder P can be stored in each container 3 in a predetermined amount at one place.

When it is determined by the measurement unit 41 that the weight of the powder P stored in the container 3 reaches a predetermined weight, the powder supply processing is completed, and the controller 211 controls the conveyance of the container 3 by the conveyance unit 4, so that the conveyance unit 4 becomes a drive state, and the container 3 is conveyed from the measurement unit 41. At this time, the notification unit 212 notifies that the state of the conveyance unit 4 is switched. The notification by the notification unit 212 is stopped after the elapse of a predetermined time.

The supply device 1 can repeatedly perform the conveyance of the container 3 to the measurement unit 41, the supply of the powder P from the stocker 5, and the conveyance of the container 3 from the measurement unit 41, and the powder P can be continuously stored in the plurality of containers 3.

After the supply of the powder P to the container 3 and the conveyance of the container 3 from the measurement unit 41 are completed, the stocker 5 is separated from the main body 2.

As explained above, since the plurality of supply ports 521 of the plurality of stockers 5 connected to the main body 2 is positioned above the supply region A, the supply device 1 can supply a plurality of kinds of powder P at one place, and thus can reduce a space required for installing the supply device 1, and contributes to space saving. Further, the controller 211 controls the conveyance of the container 3 by the conveyance unit 4 to efficiently convey the container 3. The measurement unit 41 measures the weight of the powder P stored inside the container 3, and the controller 211 controls the supply of the powder P by the supplier 52, so that the plurality of kinds of powder P can be accurately stored in a predetermined amount for each container 3.

The present invention is not limited to the embodiments described above and can be modified without departing from the technical idea of the present invention. These modifications, equivalents, and the like are also included in the technical scope of the present invention. For example, the number of stockers 5 to be mounted to the main body 2 is four in the embodiment, but 1, 2, 3, 5, etc., can be adopted as appropriate.

REFERENCE SIGNS LIST

1 . . . powder supply device
2 . . . main body
21 . . . main body portion
211 . . . controller
212 . . . notification unit
22 . . . stand frame
221 . . . pedestal portion
222 . . . leg portion
223 . . . reinforcement member
224 . . . position detection unit
225 . . . guide receiving member
3 . . . container
4 . . . conveyance unit
41 . . . measurement unit
5 . . . stocker
51 . . . charge port
52 . . . supplier
521 . . . supply port
53 . . . caster
54 . . . elastic member
55 . . . guide
A . . . supply region
B . . . arrow
P . . . powder
X . . . conveyance direction
Y . . . central axis

What is claimed is:

1. A powder supply device, comprising:
a main body;
a container comprising an opened upper side and configured to store powder therein;
a conveyance unit having a drive state in which the container placed on an upper side thereof is conveyed and a stop state in which the container placed on the upper side thereof is stopped; and
a plurality of stockers to be connected to the main body, to store the powder therein and to supply the powder to an outside thereof,
wherein the conveyance unit comprises a supply region which is a region for supplying the powder from each of the plurality of stockers to the container placed on the upper side of the conveyance unit,
wherein each of the plurality of stockers comprises:
a charge port through which the powder is to be charged into each of the plurality of stockers; and
a supplier that includes a supply port and supplies the powder stored inside each of the plurality of stockers from the supply port to the container,
wherein each of the plurality of stockers is connected to the main body, each of the plurality of stockers is arranged radially around the supply region, and a center axis of the supplier is directed to a center of the supply region,
wherein the powder is supplied to the container from the supply port when the container placed on the upper side of the conveyance unit is positioned in the supply region and the conveyance unit is in the stop state,
wherein each of the plurality of stockers is provided with guides,
wherein the main body is provided with guide receiving members,
wherein when each of the plurality of stockers is connected to the main body, the guides are inserted into the main body and fitted to the guide receiving members, and
wherein the fitting between the guides and guide receiving members prevents a deviation of a direction of the center axis of the supplier.

2. The powder supply device according to claim 1, wherein each of the plurality of stockers comprises a structure to be detachably connected to the main body.

3. The powder supply device according to claim 1, wherein the main body comprises a controller, and the controller controls conveyance of the container by the conveyance unit and supply of the powder by the supplier.

4. The powder supply device according to claim 1, wherein the conveyance unit comprises a measurement unit in the supply region, and the measurement unit measures the weight of the powder stored in the container when the container placed on the upper side of the conveyance unit is positioned on the upper side of the measurement unit, and the conveyance unit is in the stop state.

* * * * *